April 13, 1965   R. O. CASE, JR   3,178,711
HIGH RESOLUTION SCANNING RADAR
Filed Aug. 6, 1959   9 Sheets-Sheet 1
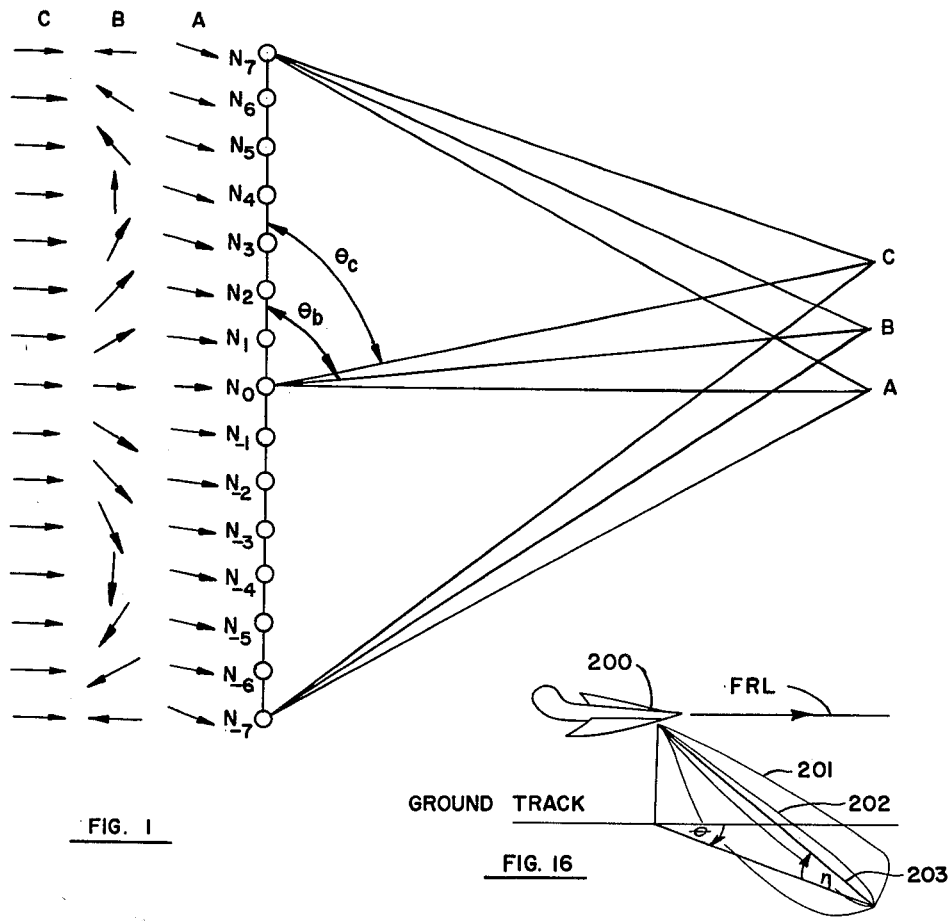
FIG. 1
FIG. 16
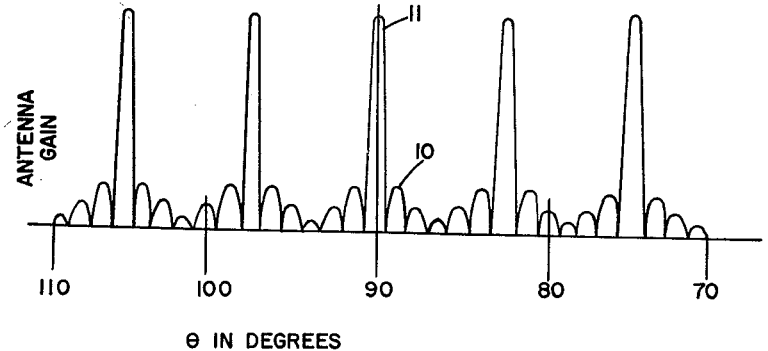
FIG. 2
*INVENTOR.*
ROBERT O. CASE, JR.
BY
ATTORNEY April 13, 1965    R. O. CASE, JR    3,178,711
HIGH RESOLUTION SCANNING RADAR
Filed Aug. 6, 1959    9 Sheets-Sheet 3

INVENTOR.
ROBERT O. CASE, JR.
BY Allan Rothenberg
ATTORNEY

INVENTOR.
ROBERT O. CASE, JR.

ATTORNEY

April 13, 1965     R. O. CASE, JR     3,178,711
HIGH RESOLUTION SCANNING RADAR

Filed Aug. 6, 1959            9 Sheets-Sheet 7

INVENTOR.
ROBERT O. CASE, JR.

BY Allan Rothenberg

ATTORNEY

April 13, 1965 R. O. CASE, JR 3,178,711
HIGH RESOLUTION SCANNING RADAR
Filed Aug. 6, 1959 9 Sheets-Sheet 8

INVENTOR.
ROBERT O. CASE, JR.
BY
ATTORNEY $\theta_A < \theta_0$ $\theta_A = \theta_0$ $\theta_A > \theta_0$

3,178,711
HIGH RESOLUTION SCANNING RADAR
Robert O. Case, Jr., La Habra, Calif., assignor to North American Aviation, Inc.
Filed Aug. 6, 1959, Ser. No. 832,403
10 Claims. (Cl. 343—16)

This invention relates to a high resolution radar system, and particularly concerns apparatus for effecting the scanning of a synthetically-generated antenna.

Conventional radars have a serious deficiency when used in aircraft for viewing the ground by virtue of a lack of resolution or ability to distinguish objects that are close together. Low resolution results in a blurred radar picture, whereas mapping, reconnaissance or bombing purposes, a sharply defined image is required in order that targets may be seen and recognized. To obtain adequate resolution in a typical ground mapping situation, an azimuth beam width on the order of 0.2° or narrower is required. The resolution of a radar is ultimately limited by the resolution of the display which is generally a cathode ray tube. However, most conventional mapping and bombing radars are not limited by the indicator except on the long range display. In expanded display modes such as are used for accurate target or checkpoint tracking, resolution is limited almost entirely by the antenna beam width and the pulse length. By making pulse length quite short, relatively high range resolution may be obtained at the expense of poorer sensitivity (i.e., maximum range).

The price in terms of practicality of equipment of greatly improved azimuth resolution is prohibitive in non-coherent radars. Either a very long antenna is required, or a very short wave length must be used. A long antenna (e.g., 15 feet or more) is generally not practical except for side looking (normal to flight direction) non-scanning applications. Very short wave lengths suffer from atmospheric absorption and present severe design difficulties at high power level.

Reconnaissance radar systems, utilizing a synthetically-generated antenna (a simulated long linear array) may achieve, in some cases, the same resolution, with an antenna of relatively small aperture, as would normally be obtainable only with an antenna hundreds of feet long. However, such radars are of the side-looking non-scanning variety and utilize time-consuming data processing systems.

Accordingly, it is an object of this invention to provide a high resolution scanning radar utilizing a physical antenna of relatively small dimensions. In the practice of this invention, as exemplified in a preferred form thereof, there is provided a vehicle borne radar system comprising a movable antenna having a predetermined boresight axis and means for generating a synthetic antenna as the system moves in a selected direction. The radar includes a reference frequency generator which defines the axis of the synthetic antenna. There is provided apparatus for generating an error signal indicative of the sense of the angular displacement of the synthetic axis relative to the boresight axis and this error signal is utilized to vary the reference frequency in a sense to decrease the angular displacement and slave the synthetic axis to the boresight axis. More particularly there is provided a pulsed antenna for transmitting energy pulses of a selected frequency and receiving reflections of such pulses of a frequency shifted by target Doppler frequency. The reflected pulses are coherently demodulated by comparison with a reference frequency signal to generate the coherent signal of a frequency in accordance with the difference between the reference frequency and the Doppler frequency of the reflected pulses. The coherent signal pulses are integrated or combined so as to provide a substantially zero output signal for an appreciable difference frequency and to provide a useful target signal solely when said difference frequency is substantially zero. The radar of the disclosed embodiment utilizes conventional monopulse techniques to obtain an error signal indicative of the displacement of the target (and therefore the synthetic axis) from the axis of the physical antenna. Thus, having a signal indicative of the angular error between the synthetic axis and the physical axis, the Doppler reference frequency which itself determines the direction of the synthetic axis is varied so as to slave the synthetic axis to the physical axis. Then, upon scanning of the physical antenna, a conventional azimuth pickoff will provide information concerning the azimuth of both the physical and synthetic axes.

With the simultaneous use of a coherent transmitter (one in which the transmitted frequency is "remembered" and compared with the returned echo), a monopulse error detecting system and means for video integration, there is available for analysis virtually all of the information contained in the radar echo such as time of arrival, direction of arrival, and amplitude and phase, together with the history and rate of change of these quantities. Therefore, the system of this invention, while illustrated as useful for accurate high resolution ground mapping, can be readily adapted to provide a number of auxiliary functions such as Doppler navigation, terrain avoidance, indication for low altitude missions, measurement of slant range to ground, automatic targt tracking, moving target indication and moving target tracking.

It is therefore an object of this invention to provide an improved radar system.

A further object of the invention is to effect scanning of a synthetic antenna.

Still another object of the invention is to provide a scanning ground viewing radar of high resolution.

A further object is the provision of improved apparatus for determining the direction of look of a synthetic antenna.

Still another object is to provide for the presentation of high resolution radar information with a minimum of time delay.

A further object is to scan a synthetic antenna without the use of externally derived velocity information.

Still another object of this invention is the provision of a high resolution ground mapping radar inherently capable of a large number of auxiliary functions.

These and other objects of the invention will become apparent from the following description taken in connection with the accompanying drawings in which FIG. 1 is a schematic representation of a long linear array antenna;

FIG. 2 illustrates the gain pattern of the antenna of FIG. 1;

FIG. 3 comprises a functional diagram of the illustrated embodiment of this invention;

FIG. 4 comprises a block diagram of the transmitting portion of the embodiment of FIG. 3;

FIGS. 6a and 6b illustrate details of the integrator of FIG. 5;

FIG. 16 is a diagrammatic view of a vehicle borne radar system.

In the drawings, like reference characters refer to like parts.

Figure 4:
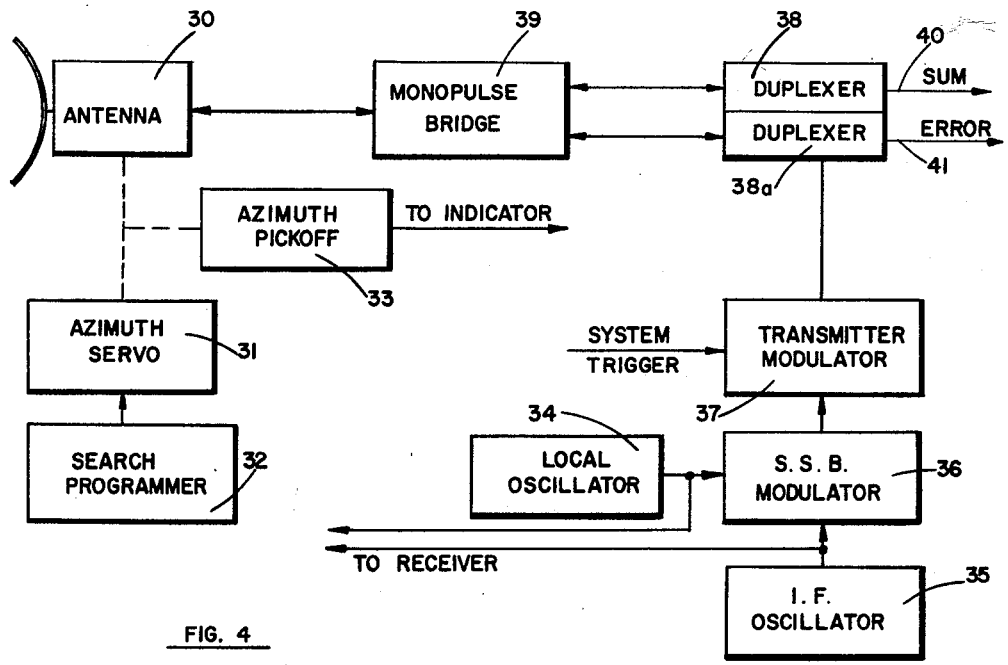

The synthetic antenna technique affords a means of obtaining the same effect (very narrow beamwidth) as would be obtained from a very long linear array antenna even though the actual antenna has a modest aperture. FIGURE 1 illustrates schematically such a linear array with 15 elements designated as $N_{-7}$ through $N_7$ respectively. Target A, on the normal to the array, is essentially equidistant from all elements of the array, provided that the range is very great compared with the length of the antenna. Therefore the echo wave front is nearly plane and parallel to the array and the signals received by the elements will be of the same phase. This condition is illustrated by the column of vectors under heading A in FIG. 1.

Target B is off-axis by an angle $\theta_b$. Because it is slightly closer to one end of the antenna than to the other, the wave front is inclined with respect to the array, and consequently there is a nearly uniform phase progression along the antenna. This condition is illustrated by the column of vectors under heading B. Because of the phase progression, the vector sum produces a smaller resultant than from target A. Target A is said to be located within a main lobe. If the angle $\theta_b$ is such that the phase progression goes through one complete cycle (360 degrees) as illustrated, the resultant will be nearly zero, and a null in the antenna pattern will exist in the direction $\theta_b$.

If the spacing between elements is several wavelengths, there will in general, be one or more directions such as $\theta_c$ for which the phase progression amounts to one complete cycle between adjacent elements. If this is the case, the individual elements will receive apparently in-phase signals and an auxiliary lobe will exist in that direction, having virtually the same gain as the main lobe. This condition is illustrated by the vectors under heading C in FIG. 1.

A sketch of the antenna pattern is shown in FIG. 2. The main lobe 11 and several auxiliary lobes are shown. The smaller side lobes such as lobe 10 exist in directions for which the phase progression along the length of the synthetic antenna goes through more than one cycle, but not an integral number of cycles. In a simple linear array antenna, the first side lobe 10 is down approximately 14 db from the main lobe 11.

The pattern of FIG. 2 can be generated synthetically by a coherent radar in a moving vehicle. In this case, the radar antenna comprises only one element of the array shown in FIG. 1. As the vehicle progresses at a uniform velocity, the radar transmits energy pulses at equispaced intervals along the flight path. For example, a radar with a pulse repetition frequency of 1000 pulses per second moving at a speed of 1000 feet per second (roughly Mach 1) will move 1 foot between successive pulses. At each position, the target echo is stored, preserving both amplitude and phase. After some number such as $n$ such video traces are stored, they are added vectorially to produce a resultant. The resultant is the same (for the case cited) as would have been obtained from a linear array $n$ ft. long, except for a factor of two in phase progression resulting from the two-way transmission characteristic of radar. In this way, it is possible to generate a synthetic antenna many times longer than any physical antenna that could be carried by an airplane. Therefore, the resultant beamwidth can be many times narrower than otherwise obtainable.

It may be noted that in the case of the synthetic antenna, the phase progression along the array is a phase variation with respect to time (i.e., the Doppler frequency shift of the target echo with respect to the transmitted frequency). Thus a main or auxiliary lobe will exist along any direction for which the Doppler frequency shift is zero or an integral multiple respectively, of the pulse repetition frequency. In this case the Doppler frequency will have gone through an integral number of cycles between transmitted pulses. A null in the antenna pattern will exist in any direction for which the difference between the Doppler frequency and nearest harmonic of the pulse repetition frequency (PRF) goes through an integral number of cycles during the time it takes to generate the antenna ($n$ milliseconds for the example above).

The main lobe of a linear array antenna may be shifted by inserting individual phase shifters in series with each antenna element. The phase shift is progressively changed along the array to cancel out the phase progression due to an off-axis target. Thus, with reference to FIG. 1, if it is desired to shift the main lobe from target A to B (i.e., from $\theta = 90°$ to $\theta = \theta_b$), the phase shifters would be arranged to generate phase changes opposite to those indicated by the direction of the vectors under heading B. After passing through the shifters, the signals from target B would be mutually in phase and therefore additive. Target A would then be within a null. The antenna pattern would shift through an angle $$\left(\frac{\pi}{2} - \theta_b\right)$$

In accordance with the invention this operation can be readily accomplished in the case of a synthetic antenna by simply shifting either the received signals or the coherent reference by a frequency equal to the Doppler frequency associated with the desired angle of look. To scan, the frequency shift is varied using a variable frequency oscillator. The system, in effect, looks (i.e., has a main lobe) only in the direction whose Doppler frequency corresponds to the frequency of the variable frequency oscillator at that instant.

Figure 3:
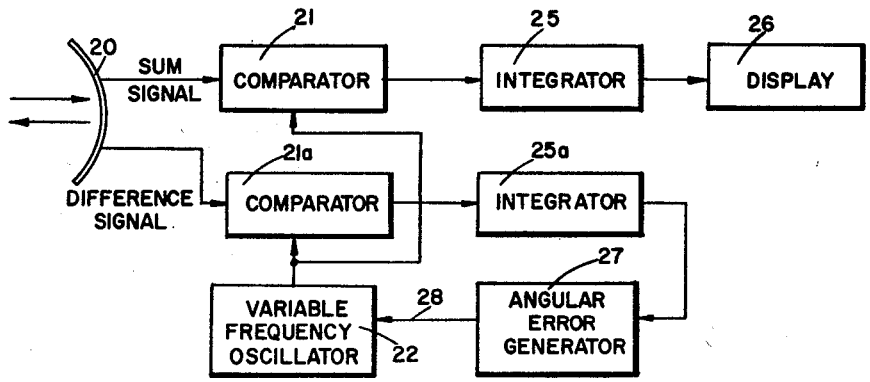
Figure 7:
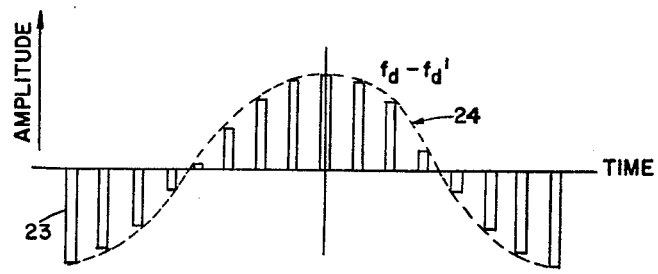
FIG. 7 illustrates the signal output of a phase detector of FIG. 5.

As illustrated in FIG. 3, a physical antenna 20 of a monopulse radar is energized at a predetermined pulse repetition rate with pulses of a selected frequency and receives pulses reflected from a target which may be some scattering element on the ground and having a frequency determined by the transmitted frequency but shifted by the target Doppler frequency (due to the relative velocity of the target and vehicle borne moving radar). Basically, to generate the synthetic antenna the echo pulses are coherently demodulated in accordance with a reference frequency. In the disclosed embodiment this is achieved by causing the target Doppler frequency (in each of the sum and difference channels) to be compared in comparison networks 21 and 21a respectively, which may be conventional phase detectors, with a reference frequency provided by variable frequency oscillator 22. This provides at the output of the comparator circuits a signal such as that designated at 24 in FIG. 7. Signal 24 comprises a train of reflected target pulses 23 whose envelope varies sinusoidally at a frequency $f_d - f'_d$ equal to the difference between the target Dopple frequency $f_d$ and the frequency $f'_d$ of the variable frequency oscillator 22. The video output is integrated in a sum channel integrator 25 which effectively cancels all the pulses of opposite polarity to provide a substantially zero output when the frequency difference $f_d - f'_d$ is not zero. On the other hand, when the frequency difference is substantially zero, the pulses 23 are of the same polarity and a useful output signal is provided from the integrator for display on a suitable indicator 26.

In the discussion herein of reading, writing, integrating, summing or weighting of "pulses" there is intended no implication of limiting the use of this invention solely to isolate targets. The described "pulse" processing is actually a processing of video traces. However, for purposes of exposition, the effect of this data processing on pulses from individual targets is shown, although it will be readily understood by those skilled in the art that an actual video trace is comprised of the superposition of the pulses from many targets, and all are treated in the manner described.

Since the target Doppler frequency is a function of the cosine of the angle between the target line of sight and the velocity vector of the radar carrying vehicle, it will be seen, as more particularly explained hereinafter, that the reference frequency itself will determine the particular direction on which will lie targets presented from the integrator to the display. Different targets may be presented by varying the reference frequency to "look" at targets in different directions. Thus, the reference frequency defines the axis of the synthetic antenna.

There is provided angular error circuitry 27, having inputs via the difference channel comparator 21a and integrator 25a from the antenna and receiver circuitry, to be described hereinafter, which provides an error signal on lead 28 in accordance with the angular displacement of the synthetic antenna axis relative to the boresight axis of the physical antenna 20. This error signal is fed to the variable reference frequency oscillator 22 to vary the frequency thereof, and thus shift the synthetic axis in a sense to decrease the displacement between the latter and the physical axis. Thus, the synthetic axis is slaved to alinement with the physical axis whereby information concerning the direction of the physical axis also provides information as to the direction of the synthetic axis. No external computation of the Doppler frequency of the target at any particular direction is necessary.

Figure 5:
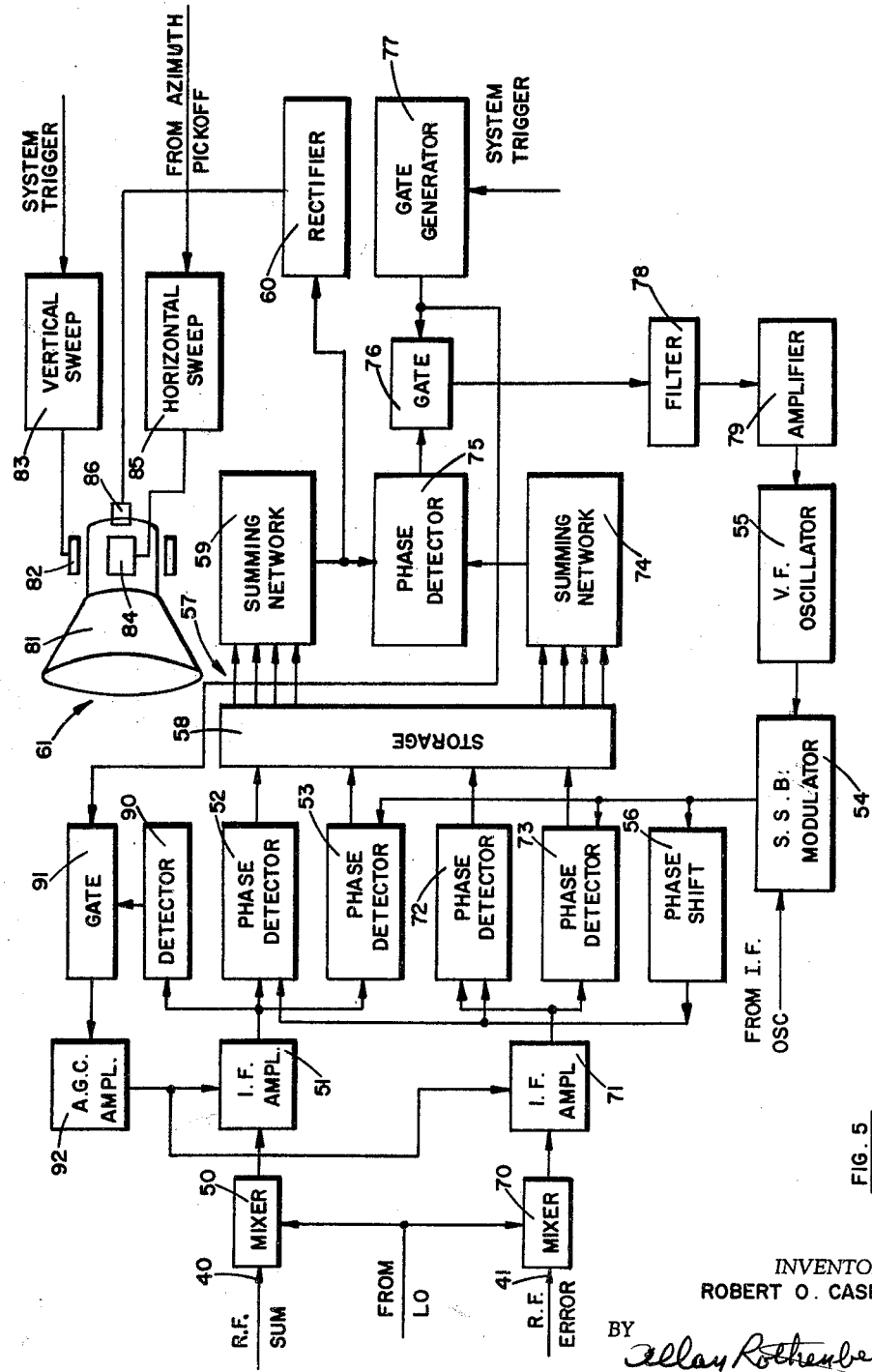
FIG. 5 is a block diagram of the receiving and display circuitry of the disclosed embodiment.

As illustrated in FIGS. 4 and 5, an exemplary mechanization of the inventive concept may be achieved by the use of a novel combination of a number of substantially conventional and well-known components. There is provided a substantially conventional monopulse radar system which is utilized to achieve boresight tracking, the slaving of the synthetic axis to the boresight axis. Monopulse radars are well known and disclosed, for example, in Patent No. 2,682,656, to Phillips, Patent No. 2,817,835 to Worthington, and an application of R. M. Ashby, Serial No. 216,145, filed March 17, 1951.

Generally a monopulse radar has at least three receiving channels; sum, azimuth error and elevation error. For the purpose of boresight tracking, only the sum and azimuth error channels are required. Of course, the elevation error channel may also be included for other purposes such as terrain avoidance as shown for example in application S.N. 698,893 of W. L. Mitchell filed November 20, 1957, for "Profiloscope."

The conventional monopulse system comprises an antenna 30 (FIG. 4), suitably mounted for scanning at least in azimuth under control of an azimuth servo 31 which is in turn controlled by a search programmer 32. The latter may provide for continuous sector scanning, for example, or, of course, may simply comprise a manual input to the azimuth servo for effecting a manual scanning if so desired. An azimuth pickoff 33, connected to the antenna drive in a conventional manner, provides a signal to the display or a computer in accordance with the instantaneous position of the antenna boresight axis.

Figure 12A:
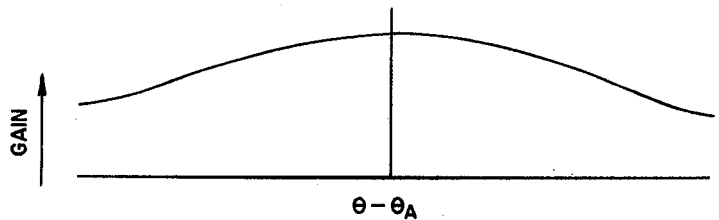
FIGS. 12a–12c illustrate the gain patterns of the physical antenna and the synthetic antenna.
Figure 12B:
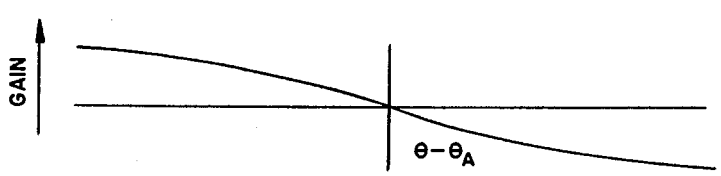

There are provided a local oscillator 34 of a frequency such as 9345 megacycles per second, for example, and an intermediate frequency oscillator 35 of 30 megacycles per second, for example, whose outputs are combined in a single sideband modulator 36 of conventional design such as that shown, for example, in "Measurements at Centimeter Wavelengths," chapter 3, by Donald D. King, D. Van Nostrand Company, Inc., New York. The single sideband modulator thus provides as its output the transmitted frequency which is a continuous wave signal at the upper sideband, for example, of 9375 megacycles per second. The output of the modulator 36 is fed to a transmitter modulator 37, synchronized from the radar system trigger, to produce a train of pulses of the upper sideband frequency at a pulse repetition rate determined by the trigger. The pulses are fed from the transmitter modulator 37 through sum and error channel duplexers 38, 38a and monopulse bridge 39 to energize the antenna 30. Echoes received by the antenna are fed via the bridge 39 and duplexers 38, 38a to the sum and error channels of the receiver via leads 40 and 41 respectively in accordance with standard monopulse techniques. The sum signal from the monopulse circuitry, as well known, is large for any target within the physical beam while the azimuth error or difference signal is zero for a target on the boresight axis and increases roughly in proportion to azimuth angular distance off axis as illustrated in FIGS. 12a and 12b. In the illustrated type of monopulse radar the error signal is in phase with the sum signal for targets on one side of the axis and out of phase by (180°) for targets on the other side of the axis. In other conventional types of monopulse radars which may be utilized herein (e.g., phase monopulse) the error signal is +90° relative to the sum signal on one side of the axis and −90° on the other.

Considering at this time solely the sum channel, the echo received from an individual target on the ground is shifted with respect to the transmitted frequency of $f_d$, the target Doppler frequency, thus having a frequency, in the chosen example, of $9375+f_d$ megacycles per second. This RF signal is fed to a sum channel mixer 50 (FIG. 5), which also has an input from the local oscillator 34 of FIG. 4 (to remove the local oscillator frequency) and thus produces an output having a frequency of $30+f_d$ megacycles per second. This signal is amplified in intermediate frequency (IF) amplifier 51 and fed as one input to a pair of conventional synchronous demodulators or phase detectors 52, 53. A coherent IF reference signal for the phase detectors is generated in a single sideband modulator 54, similar to modulator 36 by combining therein the intermediate frequency signal from IF oscillator 35 with a reference frequency $f'_d$ from a variable frequency oscillator 55.

A pair of phase detectors 52, 53 is utilized so that the phase of the coherent video may be preserved. This is accomplished by utilizing one of the phase detectors for the in-phase component and one for the quadrature component, separately integrating the components and then combining then. To this end, the coherent reference frequency from modulator 54 is fed without phase shift as the reference frequency for phase detector 53 which handles the in-phase component. The reference frequency from modulator 54 is also fed through a 90° phase shifter 56 to provide a quadrature reference input to detector 52 which handles the quadrature component. The output of each phase detector 52 and 53 comprises the coherent video such as signal 24, illustrated in FIG. 7, which varies synchronously at the difference frequency $f_d-f'_d$. The video signals are fed to an integrator 57, more particularly described hereinafter, which includes a storage device 58 and a summing device 59. The integrator stores a number of successive video pulses and adds them algebraically. For any target whose Doppler frequency $f_d$ differs appreciably from that of the variable frequency oscillator $f'_d$ the signal 24 will alternate at the difference frequency. Alternations during the integration period will cause cancellation of the integrator output signal resulting in an output which is sensibly zero. Thus, there will be substantially no output for any target lying in a direction such that its Doppler frequency differs appreciably from that of the reference frequency. However, when the frequency difference is substantially zero, the pulses fed to the integrator are of a single polarity and will produce an output which is rectified in a rectifier 60 to obtain a signal of a single polarity proportional to target amplitude and applied to an indicator 61 in the same way as in conventional radar video.

A typical display will comprise, for example, a cathode ray tube 81 having vertical ray deflecting plates 82 controlled by conventional sweep circuit 83 in synchronism with the system trigger and horizontal deflection control 84 energized by a horizontal sweep circuit 85 under control of the azimuth pickoff 33. The sum channel output after integration and rectification is fed to intensity control 86 to intensity modulate the beam trace, all as in conventional radar display.

Figure 8:
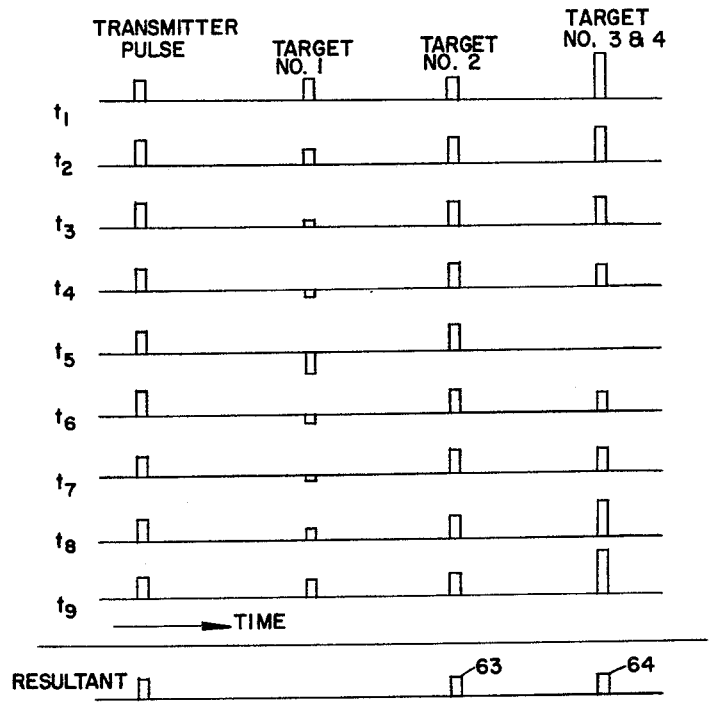
FIGS. 8 and 9 illustrate the operation of the video integrator of FIG. 5.
Figure 8B:
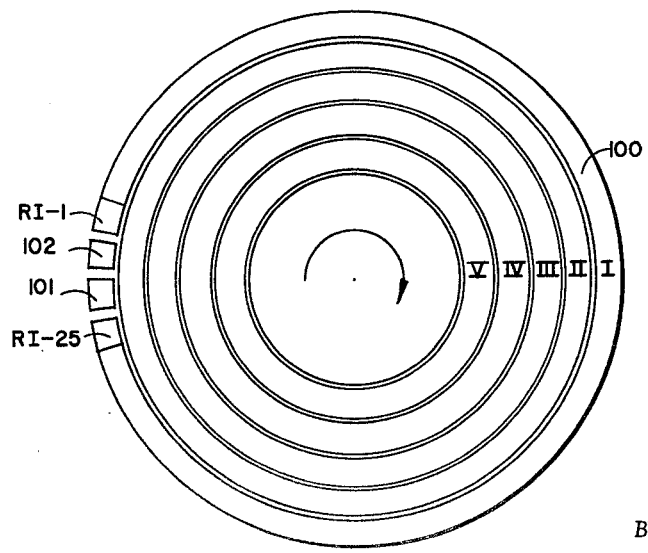
Figure 9:
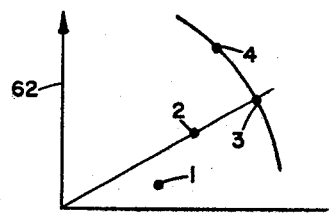

FIGS. 8 and 9 illustrate the cancellation of pulses in the video integrator 57. FIG. 9 illustrates the azimuth and range of a number of targets 1, 2, 3 and 4 in relation to the direction of travel 62 of the vehicle borne radar. In FIG. 8 is shown a plot of amplitude (vertically) against time (horizontally) of the information obtained for each of nine successive pulse periods designated as $t_1$ through $t_9$ inclusive, together with the resultant (from the integrator output for each target). Target No. 1 is off axis. Targets No. 2 and 3 are on axis but at different ranges whereby the echoes therefrom are received at different times. Target No. 4 is off axis but at the same range as target No. 3 whereby its echo is received together with that of target 3. Echoes will be received from all four targets assuming the targets are all within the beam width of the physical antenna. The range pulses containing the coherent video echoes received from the phase detectors are stored in the storage device 58 and then added in the summing network 59. As illustrated in FIG. 8 the pulses from off axis target No. 1 vary in polarity during the integration period ($t_1$ through $t_9$) and thus produce substantially no resultant output from the summing network 59. The echoes from target No. 2 are added in the integrator to produce the resultant pulse 63. The pulses indicated under targets 3 and 4 each actually comprise a composite echo of reflections from these two targets. The component of these pulses due to off axis target No. 4 will vary in much the same manner as the echoes of target No. 1 to produce substantially no resultant output whereby target No. 4 is rejected despite the fact that it is at the same range as target No. 3. On the other hand, the pulses from on axis target No. 3 will all be of the same polarity and will be added in the integrator to produce the resultant 64.

If the system scans, that is, if the reference frequency $f'_d$ is varied, targets No. 2 and 3 will no longer be on the synthetic axis and will be rejected while other targets such as target No. 4, for example, will appear. Thus, it will be seen that each individual target (for example, trees, rocks, and buildings) will contribute to the complex radar return only to the extent that it lies within the very narrow beam width of the synthetic antenna. All other echoes will be rejected by the integration processing even though they are received by the radar receiver.

From the above description of the sum channel, it will be seen that the axis of the synthetically generated antenna is defined by the reference frequency from the variable frequency oscillator 55. It is possible by the use of complex Doppler navigational computations to effect a cyclic variation of the reference frequency so that the synthetic axis may be scanned and it is possible at all times to know its direction. The present invention, however, avoids the need for such a computation and is essentially independent of knowledge of ground speed and drift (which must be known to compute Doppler frequency of target in a selected direction) by slaving the synthetic axis to the physical boresight axis of the antenna. This boresight tracking is achieved by the use of the azimuth error channel of the monopulse radar to derive a signal indicative of the angular displacement of the synthetic axis from the boresight axis. By utilizing such error signal to vary the frequency of oscillator 55, alinement of the synthetic axis with the boresight axis is maintained. The azimuth of the physical antenna, and thus of the synthetic axis, may be conveniently obtained during scanning thereof by a conventional pickoff.

The azimuth error channel video of the monopulse system is processed in the same manner as described in connection with the sum channel utilizing a separate channel in the video integrator. The RF error signal from lead 41 of the duplexer 38a is fed to an error channel mixer 70 having an input from local oscillator 34, thence to error channel intermediate frequency amplifier 71 and to the error channel quadrature and in-phase phase detectors 72 and 73 which are provided with the quadrature and in-phase components of the reference frequency from phase shifter 56 and single sideband modulator 54 respectively. The phase detector outputs of the error channel are similarly fed to storage device 58 and thence combined in summing network 74. The outputs of the sum channel summing network 59 and the error channel summing network 74 are fed to a conventional phase detector 75 which produces a signal indicative of the magnitude of the error channel signal and the sense of the error channel signal with respect to the sum signal. The output of detector 75 is fed through gate 76 under control of a gate generator 77 (to be described below), synchronized from the system trigger. The gated error signal from phase detector 75 is fed through filter 78 and amplifier 79 as a control signal to effect a variation of the frequency of oscillator 55. This closes the feedback loop by adjusting the reference frequency of oscillator 55 to null the error signal from phase detector 75 and make the synthetic axis coincide with the boresight axis. Now a conventional precision angular pickoff 33 (FIG. 4) attached to the antenna azimuth drive will indicate the instantaneous direction of both the boresight and synthetic axes and the antenna may thus be programmed in any desired search pattern by a conventional search programmer 32.

Figure 12C:
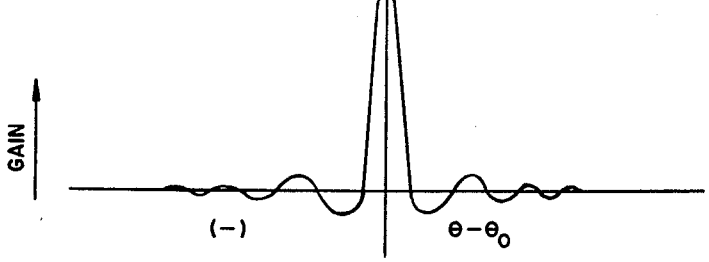
Figure 13A:
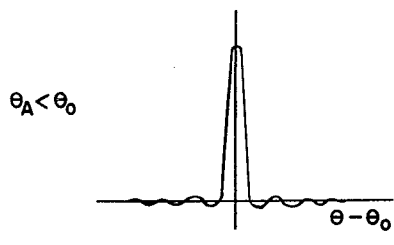
FIGS. 13a–13f illustrate the composite gain patterns of the physical and synthetic antennae.
Figure 13B:
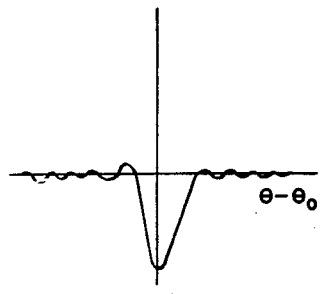
Figure 13C:
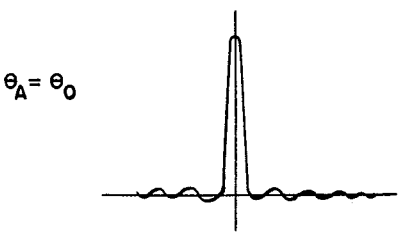
Figure 13D:
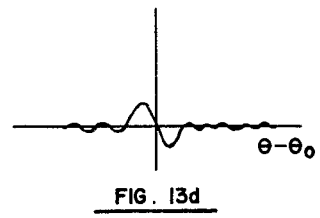
Figure 13E:
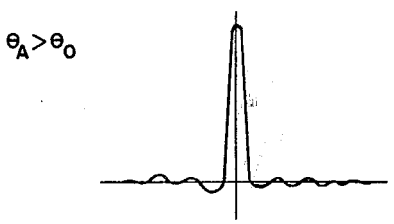
Figure 13F:
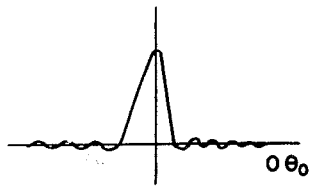

The method and apparatus for generating the error signal which controls the variable frequency reference oscillator 55 may be best described in connection with FIGS. 12 and 13. FIG. 12a comprises a plot of the gain of the sum channel of the physical antenna against the angle of the target off the boresight axis ($\theta - \theta_A$) where $\theta_A$ is the direction of the boresight axis and $\theta$ is the target direction. FIG. 12b comprises a similar graph of the antenna gain for the error channel, while FIG. 12c is a plot of the gain of the synthetic antenna as a function of the angle of the target off the synthetic axis $\theta_0$ where $\theta$ is the angle of the target. The net response of the system of FIGS. 4 and 5 to an isolated target is the product of the gains of the synthetic and physical antennae for each of the two channels. FIGS. 13a through 13f show the composite (gain product) characteristic for the sum and error channels. If $\theta_A = \theta_0$ (a condition wherein the physical and synthetic axes are alined) the error channel composite gain characteristic is symmetrical as illustrated in FIG. 13d. If $\theta_A$ is smaller than $\theta_0$ (a condition wherein the physical antenna is to the left of the synthetic antenna) the error channel response is predominantly negative as illustrated in FIG. 13b. If $\theta_A$ is greater than $\theta_0$ (a condition wherein the physical antenna is to the right of the synthetic antenna) the error channel response is largely positive as illustrated in FIG. 13f. As illustrated in FIGS. 13a, 13c and 13e, the composite sum channel characteristic does not vary in polarity as a function of the angular displacement. It will be seen from inspection of FIG. 13 that if the two axes coincide, the target is on the physical antenna axis, the error channel signal is zero and therefore the output of the error channel summing network 74 (FIG. 5) will be zero. If the synthetic axis is to the left of the boresight axis, all objects contributing to the output of the summing network 74 will be to the left of the boresight axis and the error channel input to phase detector 75 will be of the same polarity as that of the sum channel input (from summing network 59) to the phase detector 75. Similarly, if the synthetic axis is to the right of the boresight axis, the outputs from the sum and error channel networks 59 and 74 will be of mutually opposite polarity as indicated in FIGS. 13a and 13b. Therefore, it will be seen that the output of the synchronous demodulator or phase detector 75 is positive for targets to the left of the boresight axis and will have a magnitude substantially proportional to the angular displacement between the axes.

In order to insure that the error signal from phase detector 75 is proportional only to angular error and not to the reflective strength of the target, the gain of the intermediate frequency amplifiers 51 and 71 of the sum and error channels may be controlled in a conventional manner from the sum signal to hold the average output of the sum IF amplifier constant over the period of a selected gating interval. This automatic gain control is achieved by feeding the output of amplifier 51 to detector 90, thence via gate 91 to the automatic gain control amplifier 92 which controls the gain of the two IF amplifiers. The gate 91 is also controlled from the gate generator 77 which produces a relatively long gate (i.e., on the order of 10 miles or more of equivalent range) suitably delayed to center the gating interval about the range of greatest interest. Over such a long range interval, it is unlikely that there is a strong preponderance of targets on one side or the other of the synthetic axis. Therefore, the average error voltage will be proportional to $\theta_A - \theta_0$.

Figure 6A:
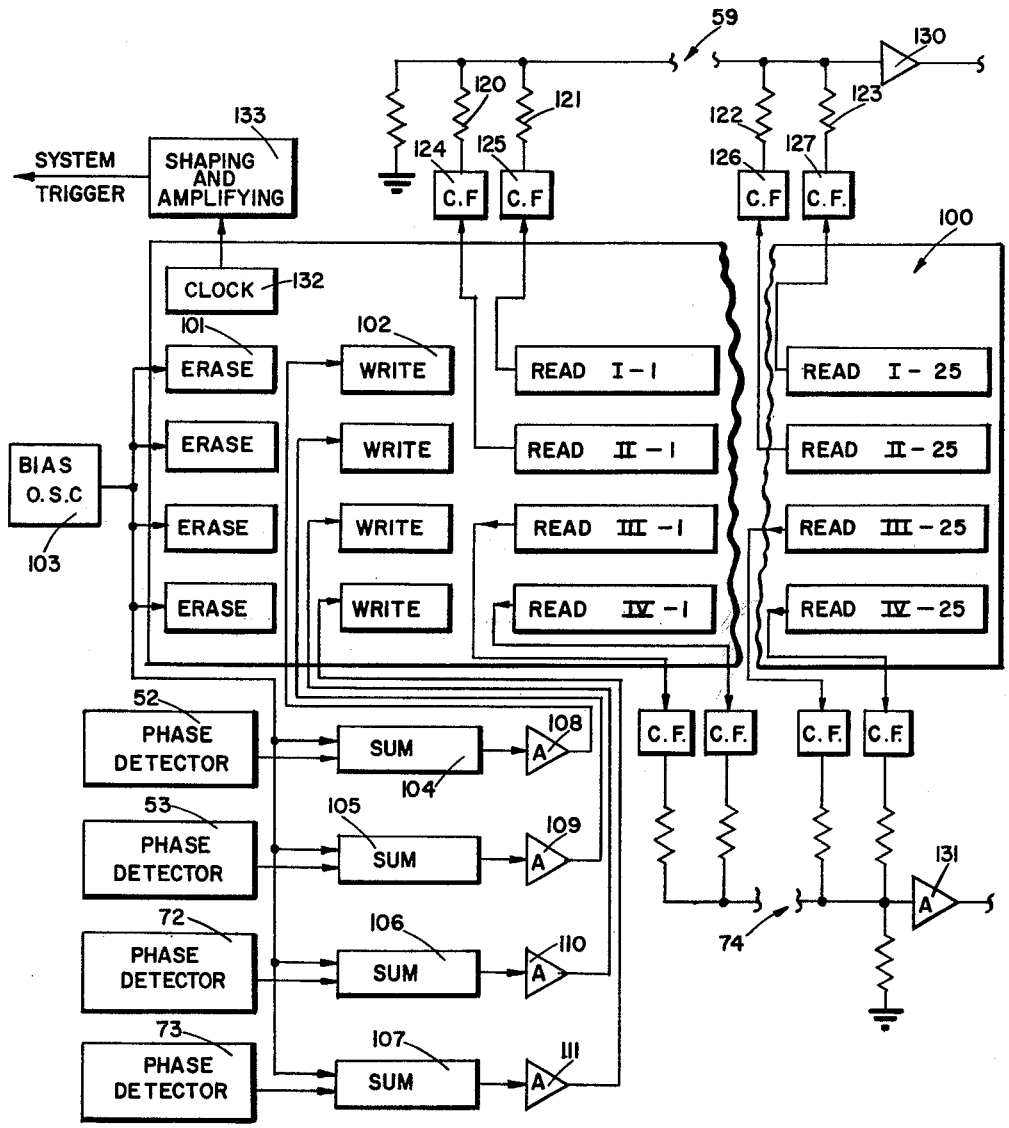

A preferred form of integrator may utilize a magnetic disc recorder of the type more particularly disclosed in an application of R. M. Ashby, Serial No. 467,704, for Magnetic Recording Data Analyzer, filed November 9, 1954, now Patent No. 2,933,724, or in an application of W. A. Farrand et al., Serial No. 413,315, for Magnetic Disc Recorder, filed March 1, 1954, now Patent No. 2,899,260. As illustrated in FIGS. 6a and 6b, such an integrator may comprise a five-channel rotatable magnetic disc 100 in which each channel will include an erase head 101, a write head 102, and a suitable number such as 25 read heads RI1 through RI25 inclusive for integrating twenty-five pulses. It is to be understood that different numbers of pulses may be integrated in other mechanizations merely by providing a number of read heads equal to the number of pulses to be integrated. Channels II, III and IV are identical with channel I and for simplicity of illustration solely the first and last read heads of channel I are illustrated. In the specifically described embodiment, the spacing of the read heads, which together with the write and erase heads are all symmetrically placed about the disc recording track, is such that all the read heads are a single pulse period apart in terms of disc angular velocity. Thus, the write head will record the successive video traces or pulses as they are received and the read heads will simultaneously read out a group of twenty-five of the most recently received video traces. As the most recent pulse is written, the twenty-sixth most recent pulse passes under the erase head and is removed. Thus, for each newly received pulse there is effectively generated another synthetic antenna of twenty-five simulated elements which is physically displaced along the velocity vector of the radar carrying vehicle by a distance equal to the distance travelled during one pulse period. The read heads will then simultaneously read each of the past twenty-five most recent video pulses and the combined outputs from the read heads at each instant of time represent the echoes from the same range increment.

The above described head spacing is a special case and, physically, the simplest case, of the more general statement that the heads must be an integral submultiple of pulse periods apart. The use of submultiples of higher than order unity is called "interlacing." The use of interlacing permits a higher disk speed, and therefore higher video fidelity and range resolution at a given PRF.

For example, suppose the read heads were located ½ pulse period apart. With a PRF of 800, one pulse period is equivalent to approximately 100 nautical miles of range. Thus, only a 50-mile increment could be used. However, the disk could go twice as fast as otherwise. The write and erase heads would have to be gated on during the selected 50-mile interval. There would have to be an odd number of head positions in this case. Heads reading successive trces (e.g., the 7th most recent and the 8th most recent trace) would be two head positions apart.

The integrator is illustrated schematically in FIG. 6b. There is a separate recording channel I through IV inclusive for each of the phase detectors 52, 53, 72 and 73, respectively. A bias oscilllator 103 is provided for energizing the erase heads and also for providing a suitable bias signal which is combined with the phase detector outputs in summing networks 104, 105, 106, and 107. The biased video signals from the summing networks 104 through 107 are fed through respective write head amplifiers 108, 109, 110 and 111 to the write heads of the respective recorder channels. The sum channel combining network 59 comprises a resistive summing network including a plurality of weighing resistors 120, 121, 122, 123 and, of course, similar resistors for the intermediate read heads which are not illustrated. The read heads are coupled with the weighing and summing resistors by means of suitable amplifiers, as illustrated by cathode followers 124, 125, 126 and 127. The summing network 74 similarly comprises a weighted resistive summing network coupled to the respective error channel read heads of disc channels III and IV by the illustrated cathode followers or the like. Thus, disc channel I stores the quadrature phase component of the sum channel video, channel II stores the in-phase component of the sum channel video, channel III stores the quadrature phase component of the error channel video, and channel IV stores the in-phase component of the error channel video. The outputs of the summing networks 59 and 74 are fed via amplifiers 130 and 131 to the phase detector 75 and rectifier 60 of FIG. 5 for the sum channel and to the phase detector 75 for the error channel.

In order to maintain exact registry of the video traces despite unavoidable small changes in disc speed, the previously described system trigger which controls the time at which the transmitter fires is most conveniently derived from the disc of the integrator itself. To this end, a fifth channel V is provided on the disc 100 upon which is permanently recorded a train of narrow timing pulses. This clock pulse train is read by a single read head 132 and passed to a pulse shaping and impliler circuit 133 from whence is derived the system trigger. The angular spacing (along the disc channels) of the pulses on the clock channel is the same as the angular spacing of the read heads on the four data processing channels I-IV to insure exact registry of the video traces independent of disc speed.

The video traces of the read heads are added in the summing networks to produce one high resolution trace representing the weighted sum of each of the pulses of a group of the most recent 25 pulses in the selected example. Each time the transmitter fires in response to a clock pulse, the resulting echo is recorded and the oldest echo is erased. Thus, one high resolution trace is generated each pulse period. While any particular read head, for example, the one removed six pulse periods from the write head, is reading a different trace each pulse period, the trace it reads will nevertheless at all times be the sixth most recent echo. Thus, the same weighting coefficient as determined by the summing network resistors 120 through 123 always applies to one particular head and no switching is necessary for weighting purposes.

The sum channel high resolution video must be rectified in rectifier 60 of FIG. 5 because of the bipolar nature of the coherent video. The polarity of the video illustrated in FIGS. 13a and 13e as resulting from an individual target is dependent upon the initial phase of the target echo. Thus, two targets on axis, but differing in range by an odd multiple of quarter-wave lengths would give opposite polarity video. The rectifier operates to provide video of a single polarity.

The use of the sum video from network 59 as a reference for the phase detector 75 is also necessary because of the bipolar nature of the coherent video. As previously explained, a target on the synthetic axis could result in either positive or negative video. However, the two channels, the sum and error channel, will always have the same polarity, whichever it may be, for a target on the synthetic axis if the physical antenna is to the right of the antenna axis. Conversely, if the physical antenna is to the left of the synthetic axis, the polarities in the two channels would be mutually opposite. As is well known, the conventional synchronous demodulator or phase detector utilized in this invention has an output inherently proportional in amplitude to its input but the polarity of the output is positive if the input and reference are in phase and negative if out of phase. Thus, the sense of the error is detected by the phase detector 75, independent of actual RF phase.

An exemplary numerical example of the generation of the synthetic antenna of the disclosed invention will facilitate understanding of the principles of the invention concept.

The synchronous demodulator 21 of FIG. 3 has an output that is proportional to the IF signal amplitude times the cosine of the phase angle between the IF signal and the reference voltage. Thus, for an individual target, $$e_0 = E \cos [2\pi(f_d - f'_d)t] \quad (1)$$

where $E$ = the amplitude of the IF signal and
$e_0$ = the amplitude of the video pulse out of the demodulator The integrator in effect produces an output $e_I$ which represents an average of the past $n$ video echo amplitudes. Thus, $$e_I = \frac{P}{N} \int_{-\frac{N}{2P}}^{\frac{N}{2P}} E \cos [2\pi(f_d - f'_d)t] dt$$

$$= \frac{\sin \left[\pi(f_d - f'_d)\frac{N}{P}\right]}{\left[\pi(f_d - f'_d)\frac{N}{P}\right]} \quad (2)$$

where $P$ = the pulse repetition frequency of the radar
$N$ = number of pulses integrated Note that $N/P$ is the integration time. This time multiplied by the velocity of the aircraft gives the length of the synthetic antenna.

The Doppler frequency can be derived as follows: the phase $\phi$ of the echo with respect to the transmitted signal is equal to $2\pi$ times the round trip path length expressed in wavelengths.

$$\phi = \phi_0 + \frac{4\pi R}{\lambda} \quad (3)$$

where $\phi_0$ = phase of the reflection coefficient of the target
$R$ = range
$\lambda$ = wavelength The Doppler frequency is the derivative of phase with respect to time. Thus, $$f_d = \frac{2\dot{R}}{\lambda} \quad (4)$$

But the range rate is simply the forward velocity $V$ times the cosine of the angle $\theta$ between the range vector and the velocity vector.

$$f_d = \frac{2V}{\lambda} \cos \theta \quad (5)$$

Letting $$f_d' = \frac{2V}{\lambda} \cos \theta_0 \quad (6)$$

then $$(f_d - f_d') \cong \frac{2V}{\lambda}(\theta - \theta_0) \sin \theta_0 \quad (7)$$

for small angles off-axis. Here $\theta_0$ is the direction of the beam of the synthetic antenna. Now the expression for the antenna pattern can be written. From Equations 2 and 7, $$\frac{e_I}{K} = \frac{\sin \left[2\pi \frac{NV\alpha}{P\lambda} \sin \theta_0\right]}{2\pi \frac{NV\alpha}{P\lambda} \sin \theta_0} \quad (8)$$

where $\alpha$ is the distance off-axis $(\theta - \theta_0)$ and $K$ is a constant. Equation 8 is plotted in FIG. 10. The —3-db point occurs where the abcissa has a value 0.225. The beamwidth is twice this value. Therefore, $$\beta_0 = \frac{0.45 P\lambda}{NV \sin \theta_0} \quad (9)$$

where $\beta_0$ is the beamwidth.

As for example, let $\lambda = 0.1$ ft. (approximately X-band)
$P = 1000$ pulses/sec.
$V = 100$ ft./s.
$N = 25$ pulses
$\theta = 30$ deg.

Then the beamwidth $\beta_0 = 3.6$ milliradians $= 0.2$ deg. The synthetic antenna in this case is 25 ft. long. By providing a larger storage capacity in the video integrator, an even narrower beam can be produced. However, the capacity of the integrator should be no larger than necessary in the interests of simplicity.

The size of the physical antenna required is of interest. It must be directional enough to reject the auxiliary lobes. An auxiliary lobe will appear at each angle for which $(f_d - f_d')$ is an exact multiple of the PRF. Setting up this condition from Equation 7 and solving for $(\theta - \theta_0)$, the distance off-axis that the first auxiliary lobe appears, $$(\theta - \theta_0) \frac{P\lambda}{2V \sin \theta_0} \quad (10)$$

The beamwidth of the physical antenna must be no larger than this angle at the maximum value of $\theta_0$. Otherwise, it is possible that the main lobe and an auxiliary lobe could both be within the physical beamwidth. Therefore, letting $\theta_m$ denote the maximum value of $\theta_0$ and $\beta_m$ the maximum permissible physical antenna beamwidth, $$\beta_m = \frac{P\lambda}{2V \sin \theta_m} \quad (11)$$

Continuing the numerical example, and letting $\theta_m = 45$ deg., $\beta_m$ is 4 deg. Thus it is seen that a 30-in. antenna, which has a beamwidth of about 2.8 deg. at X-band, is more than adequate. The physical antenna is, of course, scanned in synchronism with the synthetic antenna is accordance with the principle of this invention.

It is seen from Equation 9 that the beamwidth of the synthetic antenna is a function of look angle. The larger this angle becomes, the better the resolution. There is no resolution improvement straight ahead. However, a significant improvement is made even at very small angles. This factor can be determined by combining Equations 9 and 11 to obtain the ratio of the physical antenna beamwidth $\beta_A$ to the synthetic antenna beamwidth $\beta_0$.

$$\frac{\beta_A}{\beta_0} = \frac{N \sin \theta}{0.9 \sin \theta_m} \quad (12)$$

Figure 11:
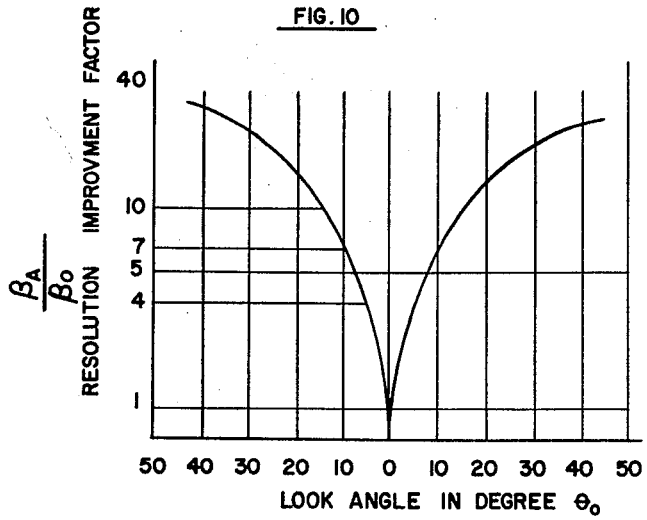
FIG. 11 is a graph depicting resolution improvement obtained with this invention.

The above ratio is plotted in FIG. 11 for $\theta_m = 45$ deg. It represents the factor by which the resolution is improved by virtue of the data processing. It can be seen that an improvement by a factor of 5 is obtained at only 8 deg. from flight path. At 30 deg., an improvement by a factor of 20 is obtained. In the limit, for a nonscanning antenna, or where $\theta_0 = \theta_m$, the resolution improvement possible is a factor which is numerically equal, approximately, to the number of video traces integrated.

In no case, even when looking straight ahead, can the improvement factor become less than unity. It is obvious that the effective beamwidth cannot be larger than the physical beamwidth.

Figure 10:
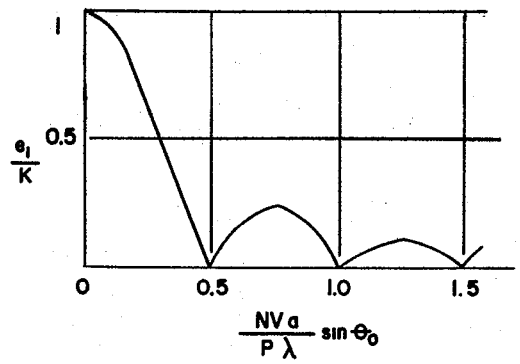
FIG. 10 illustrates the beam pattern of the synthetic antenna.

Optimumly, if deemed necessary or desirable, the beam pattern of FIG. 10 may be shaped, utilizing the same weighting functions as are commonly utilized in the design of linear array antennas. As is well known, in a linear array, side lobes can be suppressed through a non-uniform current distribution among the radiating elements (as described for example in "A Current Distribution for Broad Side Arrays," by C. L. Dolph, Proceedings of the I.R.E., volume 34, June 1946, page 335). In the synthetic antenna herein disclosed, the conventional weighting factors may be applied to the video signals prior to summation by choice of suitable values for resistors such as 120 through 123 of the sum and error summing networks. Other types of weighing are well known in the art and may be utilized. For example, in order to obtain a suitable side lobe suppression, the resistors of the summing network will be relatively weighted in accordance with the following relative values:

| Read head number: | Relative value of resistor |
| --- | --- |
| 1, 27 | 2.549 |
| 2, 26 | 3.919 |
| 3, 25 | 3.044 |
| 4, 24 | 2.452 |
| 5, 23 | 2.037 |
| 6, 22 | 1.737 |
| 7, 21 | 1.516 |
| 8, 20 | 1.352 |
| 9, 19 | 1.231 |
| 10, 18 | 1.141 |
| 11, 17 | 1.076 |
| 12, 16 | 1.033 |
| 13, 15 | 1.008 |
| 14 | 1.000 |

Since the look angle of the synthetic antenna axis is a function of the Doppler frequency, it will be seen that scanning of the antenna will introduce a defocusing effect. In some applications, such defocusing may be tolerated and thus no provision may be necessary to avoid the defocusing effect of scanning. This effect is, however, a function of scanning frequency and thus phase weighting of the video pulses prior to summation may be desirable for a rapidly scanning system. Therefore, the individual signals from the several integrator read heads may be phase shifted, each in an amount which may be computed for a particular scanning frequency. It is to be understood that phase shift here means not the electrical phase of the signal read by the read head, but rather, the phase of the Doppler frequency contained in the amplitude modulation of the video signal. In order to allow use of phase shifting techniques, the sum and error signals from the IF amplifiers are handled in terms of their in-phase and quadrature components. With such an arrangement, the phase weighting may be mechanized by passing the in-phase voltage through an attenuator having a value cosine $\phi_k$ and the quadrature voltage through an attenuator having a value sine $\phi_k$ where a different value $\phi_k$ is assigned to each read head of the magnetic recorder. The particular value of $\phi_k$ for the individual read head will then determine the value of the weighted resistor such as resistors 120 through 123 of the summing network. When both amplitude weighting (for side lobe supression) and phase weighting (for focusing) are desired, the weighting functions may be conveniently combined to determine the value of a single resistor of the summing network of each read head. It can be shown that if the scanning frequency is properly programmed with respect to pulse repetition frequency, ground speed, and direction of the area being scanned, the phase weighting function $\phi_m$ of the $m$th read head will be $K_1 m^2$, where $K_1$ is a constant. For example, if there are 27 read heads and the programmed scan is such as to result in five hits per scan, $K_1 = 0.0206$ radian. Thus, for example, in the sum channel of FIG. 6a, resistor 121 which provides the weighting function for the first read head of the quadrature component of the sum video would have a value $a_1 \sin \phi_1$ (where $a$ provides the amplitude weighting and $\sin \phi$ the phase weighting) and resistor 123 which provides the weighting function for the 25th read head of the quadrature component would have value $a_{25} \sin \phi_{25}$. Similarly, resistor 120 and resistor 122, providing the weighting of the in-phase components, would have values of $a_1$ cosine $\phi_1$ and $a_{25}$ cosine $\phi_{25}$ respectively to thereby provide by means of a single resistor for each read head both amplitude and phase weighting.

The synthetic axis is not actually a straight line for all flight and mapping conditions. Rigorously the system will respond only to those targets which are illuminated by the physical antenna and whose Doppler frequencies lie within a narrow band centered at the Doppler reference frequency of the oscillator 55. The locus of targets of constant Doppler frequency is a circular cone whose apex is at the airplane and whose axis is directed along the velocity vector. In level flight, the intersection of this cone with level ground forms a hyperbola. The loci of points on the ground at various Doppler frequencies thus form a family of hyperbolas. Therefore, the axis of the synthetic antenna is actually curved. However, the curvature of the antenna axis may be neglected since it is negligibly small for ranges which are large compared to the height above the ground. Thus, there is no problem here for low flying aircraft. For high flying aircraft, the parametric equation of the antenna axis in ground coordinates is $$x = K_2 R$$
$$y = \sqrt{R^2(1 - K_2^2) - h^2}$$

where $x =$ ground distance in the direction of flight
$y =$ ground distance at right angles to the flight path
$R =$ slant range
$h =$ altitude (above the ground)
$K_2 =$ cosine of angle between range vector and velocity vector (as established by the Doppler reference frequency of oscillator 55)

Therefore, in some cases where the non-linearity of the display cannot be tolerated, by utilizing conventional well-known techniques an undistorted ground map may be displayed upon the cathode ray tube by attenuating the vertical deflection linear sawtooth as a function of the factor $K_2$, the cosine of the look angle and utilizing a horizontal deflection which is a conventional hyperbolic ground sweep, in which the range voltage is attenuated by a factor $\sqrt{1 - K_2^2}$ the sine of the look angle.

The variable frequency oscillator 55 (FIG. 5) may be only roughly linear since it is utilized to maintain a null condition of the output of phase detector 75. However, if an accurately linear variable frequency oscillator is provided, the input thereto will be accurately proportional to the Doppler frequency along the synthetic axis and therefore along the boresight axis. The Doppler frequency is, of course, itself directly related to the component of ground speed along the axis and thus the system will provide at the output of amplifier 79 a signal from which total ground speed vector may be computed as the antenna scans and the ground speed components are sequentially measured. Therefore, in the practice of this invention, not only is it unnecessary to employ a separate Doppler navigational radar to compute the Doppler frequency desired for scanning, but the system may itself provide the information ordinarily available from such a navigational radar.

Figure 15:
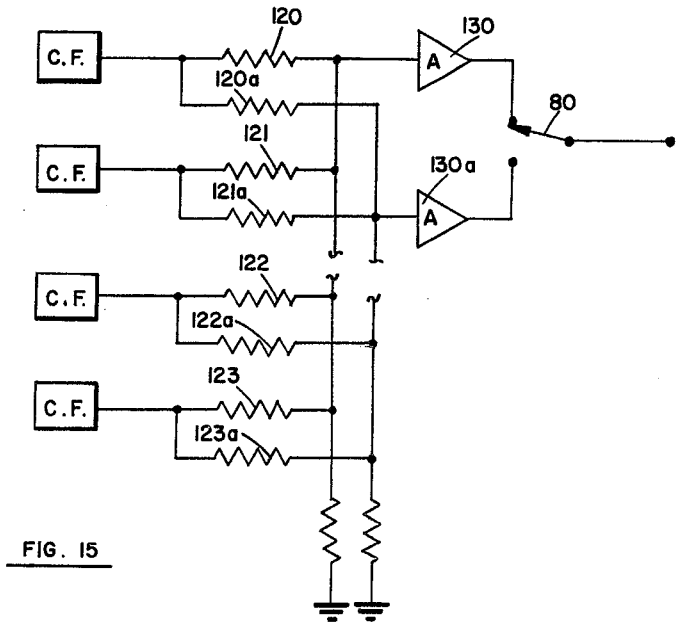
FIG. 15 illustrates the arrangement for providing alternative weighting.
Figure 14:
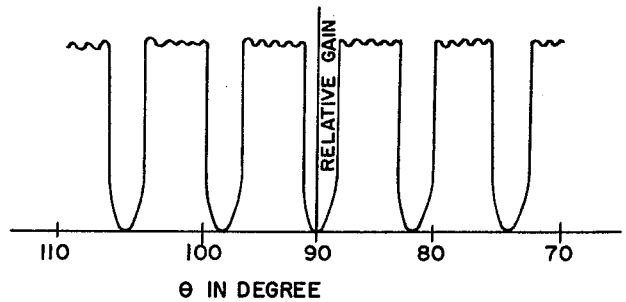
FIG. 14 illustrates a synthetic antenna gain pattern which may be obtained by an alternative weighting arrangement.

A considerably improved moving target indication is alternatively available from the disclosed invention which has available apparatus suitable for high order multiple pulse cancellation as more particularly described in the above-mentioned application of R. M. Ashby, Serial No. 467,704. Such a modification may be simply provided as partially illustrated in FIGS. 14 and 15. By providing an alternative set of weighting resistors applied to the recorded video traces of the integrator there may be achieved a synthetic antenna pattern illustrated in FIG. 14 which is of a band rejection type of filter action rather than of the bandpass action of FIG. 2. As illustrated in FIG. 15, the summing and weighting network 59 is simply provided with two sets of weighting resistors in the sum channel. A second set of weighting resistors 120a, 121a, 122a and 123a is provided for feeding the sum of signals thereof to an amplifier 130a and the outputs of the two amplifiers 130 and 131a are alternatively connected to the rectifier 60 by means of a suitably operated two-position switch 80. One set of resistors 120 through 123 is used for high resolution ground mapping and the other set 120a through 123a is switched in for use in moving target indication. The error channel remains the same in the two modes so that even in moving target indication the synchronous boresight tracking is accomplished. The difference is that the sum channel will now reject rather than pass all video resulting from on-axis targets. The rejection band is large enough to include all stationary targets illuminated by the physical antenna beam. Thus, stationary clutter is eliminated. A typical set of relative values for the moving target indication weighting resistors 120a, etc., is as follows:

| Read head number: | Relative value of resistor |
|---|---|
| 1 and 27 | −20.42 |
| 2 and 26 | ∞ |
| 3 and 25 | +17.28 |
| 4 and 24 | ∞ |
| 5 and 23 | −14.13 |
| 6 and 22 | ∞ |
| 7 and 21 | +11.00 |
| 8 and 20 | ∞ |
| 9 and 19 | −7.854 |
| 10 and 18 | ∞ |
| 11 and 17 | +4.713 |
| 12 and 16 | ∞ |
| 13 and 15 | −1.571 |
| 14 | +1.000 |

A minus number signifies the use of a resistor having a relative value equal to the magnitude shown, but connected to opposite (negative phase) side of its respective read head coil. An infinite value of resistance signifies an absent resistor (open circuit). The example shown rejects a band of Doppler frequencies equal to approximately 50 percent of the total available. For other rejection bands, different values of weighting resistors would be used, including the general case where no resistors has an infinite value.

Moving targets illuminated by the physical antenna beam will, in general, have a different Doppler frequency shift than stationary targets at the same azimuth angle. Therefore, they will be within the pass band (the difference frequency from the output of the phase detectors 52, 53 will be non-zero for such moving targets) and they will appear on the indicator.

There has been disclosed a high resolution scannable radar utilizing monopulse techniques and a multi-channel integrator to derive a signal proportional in sense and magnitude to the angular error between the boresight axis and the axis of the high resolution synthetically generated antenna. The error signal is servoed to zero in the disclosed embodiment by driving the synthetic axis (through the reference frequency oscillator) to thereby slave the two axes to alinement. It will be readily appreciated that the error signal may be alternatively utilized to control the boresight axis by means of the antenna azimuth servo to achieve slaving of the boresight axis to the synthetic axis. The one axis that is not driven by the error signal may itself be scanned in any suitable manner to thus achieve scanning of the two together.

Although the invention has been described and illustrated in detail, it is to be clearly understood that the same is by way of illustration and example only and is not to be taken by way of limitation, the spirit and scope of this invention being applicable to a variety of other embodiments.

I claim:
1. A monopulse radar system comprising a pulsed transmitter including an oscillator of predetermined frequency; an antenna having a boresight axis and coupled with said transmitter for radiating and receiving pulses and reflections thereof; a variable frequency oscillator; first and second receiver channels for respectively receiving sum and difference signals from said antenna, each receiver channel comprising a phase detector having an input from the received antenna signals, and an integrator having an input from said phase detector; modulating means responsive to said oscillators for providing a reference signal input to said phase detectors having a frequency of one of said oscillators shifted by the frequency of the other; means responsive to said difference channel integrator for generating an error signal; means responsive to said error signal for varying the frequency of said variable frequency oscillator; and output means coupled with the integrator of said sum receiver.

2. In a radar, a pulsed antenna for transmitting energy pulses of a selected frequency and receiving reflections of said pulses shifted by target Doppler frequency, phase-detector means for comparing said reflected pulses with a reference signal of a variable frequency to generate a signal of a frequency corresponding to the phase detected response signal of said phase detector means to the Doppler frequency of said reflected pulses, means for integrating said phase detected signal to produce an output signal for reflections from targets in a direction determined by said reference frequency, means for generating an error signal indicative of the sense of the displacement of said direction relative to a selected physical axis of said antenna, and means for varying the frequency of said reference signal in accordance with said error signal.

3. In a radar, frequency oscillator means for generating a first signal, transmitter modulating means responsive to said signal for providing a train of pulses to be transmitted at a selected repetition rate, an antenna coupled with said modulating means for radiating energy pulses and receiving reflections of said pulses shifted by target Doppler frequency, voltage controlled oscillator means for generating a second signal, combining means responsive to said frequency oscillator means and said voltage controlled means for providing a reference signal shifted in frequency by said second frequency, demodulating means responsive to said combining means for demodulating said reflected pulses in accordance with said shifted reference signal to generate a video signal of a frequency in accordance with the frequency difference between said second signal and said reflected pulses, integrating means responsive to said demodulation means for integrating said video signal in a direction determined by said second signal, and means responsive to said integrating means for varying the frequency of said second signal to slave said signal direction to a direction having a predetermined relation to said antenna.

4. In a radar having a directional transmitting receiving system for transmitting pulses of predetermined frequency in the direction of an axis of said system and for receiving pulses reflected from a target illuminated thereby, said reflected pulses having a frequency shifted by the target Doppler frequency, a source of variable reference frequency means responsive to said reflected pulses and said source for demodulating said reflected pulses to remove said predetermined frequency and generate signal pulses of a frequency corresponding to the difference between said Doppler and reference frequencies, means for summing a number of said signal pulses to produce an output signal, means for generating a displacement signal indicative of the sense of the displacement of the pulse reflecting target from said axis, and means responsive to said output and displacement signals for varying said reference frequency to decrease said difference frequency.

5. A radar system comprising an antenna having a boresight axis, means coupled with said antenna for receiving pulses reflected by a target and having a frequency shifted by target Doppler frequency, a reference frequency generator, means responsive to said receiving means and generator for providing a signal comprising a train of said reflected pulses having an envelope varying at a frequency determined by the difference between said target Doppler frequency and the frequency of said generator, means for integrating said signal to provide an output signal for a target lying in a direction such that the Doppler frequency thereof is equal to said reference frequency, means for generating an error signal indicative of the angular displacement of said target direction relative to said boresight axis, and means for varying said reference frequency in accordance with said error signal.

6. A radar system comprising an antenna having a boresight axis, means coupled with said antenna for receiving pulses reflected by a target and having a frequency shifted by target Doppler frequency, a reference frequency generator, demodulator means responsive to said receiving means and generator for providing a signal comprising a train of said reflected pulses having an envelope varying at a frequency determined by the difference between said target Doppler frequency and the frequency of said generator, means for integrating said signal pulse train to provide an output signal for a target lying in a direction such that the Doppler frequency thereof is equal to said reference frequency, means for generating an error signal indicative of the angular displacement of said target direction relative to said boresight axis, and means for varying said reference frequency in accordance with said error signal, said integrating means comprising a movable record medium having an information channel, means responsive to said demodulator means for writing said pulses on said channel, a plurality of reading means spaced along said channel for simultaneously reading the pulses of a group of most recently written pulses, means for individually weighting the pulses read by a number of said read heads, and means for summing the outputs of said weighting means.

7. A monopulse radar system comprising a pulsed transmitter including an oscillator of predetermined frequency; an antenna having a boresight axis and coupled with said transmitter for radiating and receiving pulses and reflections thereof; a variable frequency oscillator; first and second receiver channels for respectively receiving sum and difference signals from said antenna, each receiver channel comprising first and second phase detectors each having an input from the received antenna signals, and in integrator having an input from said phase detectors; modulating means responsive to said oscillators for providing to said first phase detectors of said first and second channels a reference signal input having a frequency of one of said oscillators shifted by the frequency of the other; a phase shifter interconnecting said modulating means with said second phase detectors of said first and second channels; means responsive to said integrators for generating an error signal; means responsive to said error signal for varying the frequency of said variable frequency oscillator; and output means coupled with the integrator of said first receiver channel.

8. A monopulse radar system comprising a pulsed transmitter including an oscillator of predetermined frequency; an antenna having a boresight axis and coupled with said transmitter for radiating and receiving pulses and reflections thereof; a variable frequency oscillator; first and second receiver channels for respectively receiving sum and difference signals from said antenna, each receiver channel comprising a phase detector having an input from the received antenna signals, and an integrator having an input from said phase detector; said integrators collectively comprising a rotatable magnetic medium having sum and difference information tracks each having a write read responsive to its associated channel phase detector, each track having a plurality of read heads spaced therealong for simultaneously reading a group of pulses recorded by the associated write head, and means for individually weighting and combining the read head outputs for each track; modulating means responsive to said oscillators for providing a reference signal input to said phase detectors having a frequency of one of said oscillators shifted by the frequency of the other; means responsive to said integrator combining means of said sum and difference tracks for generating an error signal; means responsive to said error signal for varying the frequency of said variable frequency oscillator; and output means coupled with the integrator combining means of first receiver channel.

9. A vehicle borne monopulse radar comprising a local oscillator, an intermediate frequency oscillator, a single side band modulator having inputs from said oscillators, a transmitter modulator having an input from said single side band modulator, an antenna, sum and error duplexers and a monopulse bridge coupling said transmitter modulator to said antenna, a sum mixer having inputs from said sum duplexer and said local oscillator, first and second phase detectors having inputs from said sum mixer, a reference frequency oscillator, a second single side band modulator having inputs from said reference and intermediate frequency oscillators, said first phase detector having a reference frequency input from said second single side band modulator, a ninety-degree phase shifter having an input from said second single side band modulator, said second phase detector having a reference frequency input from said phase shifter, a rotatable record medium having first and second recording tracks thereon, first and second write heads having inputs from said phase detectors respectively for writing on respective tracks, first and second groups of read heads spaced along said tracks for simultaneously reading information written thereon by said write heads respectively, a resistive summing network having a plurality of resistors each individually coupled with a respective one of said read heads, and an indicating device having an input from said summing network.

10. A vehicle borne monopulse radar comprising a local oscillator, an intermediate frequency oscillator, a single side band modulator having inputs from said oscillators, a transmitter modulator having an input from said single side band modulator, an antenna, sum and error duplexers and a monopulse bridge coupling said transmitter modulator to said antenna, a sum mixer having inputs from said sum duplexer and said local oscillator, first, second, third and fourth phase detectors, said first and second phase detectors having inputs from said sum mixer, a variable frequency oscillator, a second single side band modulator having inputs from said variable and intermediate frequency oscillators, said first phase detector having a reference frequency input from said second single side band modulator, a ninety-degree phase shifter having an input from said second single side band modulator, said second phase detector having a reference frequency input from said phase shifter, a rotatable record medium having first, second, third and fourth recording tracks thereon, first, second, third and fourth write heads having inputs from said phase detectors respectively for writing on respective tracks, first, second, third and fourth groups of read heads spaced along respective tracks for simultaneously reading information written thereon by said write heads respectively, a first resistive summing network having a plurality of resistors each individually coupled with a respective one of the read heads of said first and second groups, an error mixer having inputs from said error duplexer and said local oscillator, said third and fourth phase detectors each having an input from said error mixer and having a reference frequency input from said second single side band modulator and from said phase shifter respectively, a second resistive summing network having a plurality of resistors each individually coupled with a respective one of the read heads of said third and fourth groups, a fifth phase detector having inputs from said first and second summing networks, said variable frequency oscillator having a frequency control input from said fifth phase detector, and an indicating device having an input from said first summing network.

References Cited by the Examiner

UNITED STATES PATENTS

| | | | |
|---|---|---|---|
| 2,682,656 | 6/54 | Phillips | 343—16.1 |
| 2,776,426 | 1/57 | Altman | 343—16.1 |
| 3,011,166 | 11/61 | Fell et al. | 343—7.7 |
| 3,083,360 | 3/63 | Weltz et al. | 343—16 |
| 3,099,833 | 7/63 | Tucker et al. | 343—16 |
| 3,121,868 | 2/64 | Hausz et al. | 343—5 |

OTHER REFERENCES

Ridenour, "Radar Systems Engineering," vol. 1, Radiation Laboratory Series, published 1947, McGraw-Hill, pp. 626 to 656.

CHESTER L. JUSTUS, *Primary Examiner.*